United States Patent
Kamiyama et al.

(10) Patent No.: US 11,444,271 B2
(45) Date of Patent: Sep. 13, 2022

(54) LITHIUM-ION BATTERY INCLUDING ELECTRODE WITH TAB SECTION HAVING SUBSTRATE-EXPOSED PORTION

(71) Applicants: PANASONIC CORPORATION, Kadoma (JP); SANYO Electric Co., Ltd., Daito (JP)

(72) Inventors: Yuma Kamiyama, Osaka (JP); Ryosuke Iwata, Hyogo (JP); Katsuya Shiozaki, Hyogo (JP)

(73) Assignees: Panasonic Holdings Corporation, Kadoma (JP); SANYO Electric Co., Ltd., Daito (JP)

( * ) Notice: Subject to any disclaimer, the term of this patent is extended or adjusted under 35 U.S.C. 154(b) by 282 days.

(21) Appl. No.: 16/640,208

(22) PCT Filed: Nov. 2, 2018

(86) PCT No.: PCT/JP2018/040796
§ 371 (c)(1),
(2) Date: Feb. 19, 2020

(87) PCT Pub. No.: WO2019/098056
PCT Pub. Date: May 23, 2019

(65) Prior Publication Data
US 2020/0185700 A1  Jun. 11, 2020

(51) Int. Cl.
*H01M 4/13* (2010.01)
*H01M 10/0525* (2010.01)
(Continued)

(52) U.S. Cl.
CPC .......... *H01M 4/13* (2013.01); *H01M 10/054* (2013.01); *H01M 10/0525* (2013.01); *H01M 2004/021* (2013.01)

(58) Field of Classification Search
CPC .. H01M 4/13; H01M 10/0525; H01M 10/054; H01M 2004/021; H01M 50/543; H01M 4/661; H01M 10/0585; Y02E 60/10
(Continued)

(56) References Cited

U.S. PATENT DOCUMENTS

2017/0005318 A1   1/2017 Otohata
2019/0148778 A1*  5/2019 Kubo ................. H01M 4/0416
                                                 429/213

FOREIGN PATENT DOCUMENTS

CN   108305988 A   7/2018
JP   7-226197 A    8/1995
(Continued)

OTHER PUBLICATIONS

International Search Report dated Jan. 29, 2019, issued in counterpart International Application No. PCT/JP2018/040796 (2 pages).

*Primary Examiner* — Gary D Harris
(74) *Attorney, Agent, or Firm* — WHDA, LLP

(57) ABSTRACT

A battery includes an electrode assembly having a positive electrode and a negative electrode. The positive electrode includes a positive electrode substrate, a positive electrode active material layer formed on the surface of the positive electrode substrate, and a positive tab section having a substrate-exposed portion in which the positive electrode active material layer is not formed on the surface. The positive electrode active material layer has a notch in the end of the positive electrode active material layer. The outer edge of the notch encloses an end of a boundary where the positive tab section and the positive electrode active material layer come into contact.

6 Claims, 4 Drawing Sheets

(51) Int. Cl.
*H01M 10/054* (2010.01)
*H01M 4/02* (2006.01)

(58) Field of Classification Search
USPC .......................................................... 429/322
See application file for complete search history.

(56) References Cited

FOREIGN PATENT DOCUMENTS

| | | |
|---|---|---|
| JP | 2006-139968 A | 6/2006 |
| JP | 2013-73757 A | 4/2013 |
| JP | 2013-187077 A | 9/2013 |
| JP | 2017-69207 A | 4/2017 |
| WO | 2015/147066 A1 | 10/2015 |

* cited by examiner

LITHIUM-ION BATTERY INCLUDING ELECTRODE WITH TAB SECTION HAVING SUBSTRATE-EXPOSED PORTION

TECHNICAL FIELD

The present disclosure relates to a lithium-ion battery.

BACKGROUND ART

Lithium-ion batteries are used as power sources for driving electric vehicles (EVs), hybrid electric vehicles (HEVs, PHEVs), and so forth. Such lithium-ion batteries are batteries that undergo charging and discharging through movement of lithium ions between the positive and negative electrodes.

These lithium-ion batteries include a positive electrode and a negative electrode in each of which an active material layer containing an active material is formed on the surface of a metal foil substrate. For such rechargeable batteries used for electric vehicles (EVs), hybrid electric vehicles (HEVs, PHEVs), and so forth, a further increased volume energy density is needed. A possible way to increase the volume energy density of rechargeable batteries is to further increase a filling density in the active material layer. As a result, it is possible to increase the amount of an active material contained within the battery case, thereby enhancing the volume energy density.

Patent Literature 1 describes a stack-type battery comprising first-polarity electrodes each including: an electrode section in which an active material layer is formed on a current collector; a lead section in which the active material layer is not formed on the current collector; and an insulating layer disposed over the boundary region between the electrode section and the lead section from the active material layer to the unformed region of the active material layer, where an insulating layer of a first-polarity electrode and insulating layers of other first-polarity electrodes are formed at least partially at different positions when viewed from the stacking direction.

CITATION LIST

Patent Literature

PTL 1: International Publication No. 2015/147066

SUMMARY OF INVENTION

An electrode assembly having a stacked structure of positive electrodes and negative electrodes is provided, at an end of each electrode, with a tab section having a substrate-exposed portion in which an active material layer is not formed. Here, it was found that a tab section provided on either of the electrodes also expands and contracts due to expansion and contraction of an active material layer of the other electrode associated with charge/discharge and that the resulting stress generated within the tab section could cause bending or creases. When bending or creases occur in a tab section, an electrode that has the tab section curves and increases a distance to the other electrode, thereby increasing electric resistance. As a result, lithium metal could be deposited on the electrode surface. The probability of this phenomenon is considered high, in particular, when the filling density of an electrode active material is high or when high-rate charge/discharge is performed.

For this reason, an object of the present disclosure is to provide a lithium-ion battery with suppressed lithium metal deposition that occurs on the electrode surface through charge/discharge.

A lithium-ion battery of an embodiment of the present disclosure is characterized by comprising an electrode assembly including a first electrode and a second electrode, where: the first electrode includes a substrate, a first active material layer formed on a surface of the substrate, and a first tab section having a substrate-exposed portion in which the first active material layer is not formed on the surface; the first active material layer has a notch in an end of the first active material layer; and an outer edge of the notch encloses an end of a boundary where the first tab section and the first active material layer come into contact.

According to the present disclosure, it is possible to provide a lithium-ion battery with suppressed lithium metal deposition that occurs on the electrode through charge/discharge.

DESCRIPTION OF EMBODIMENTS

Figure 1:
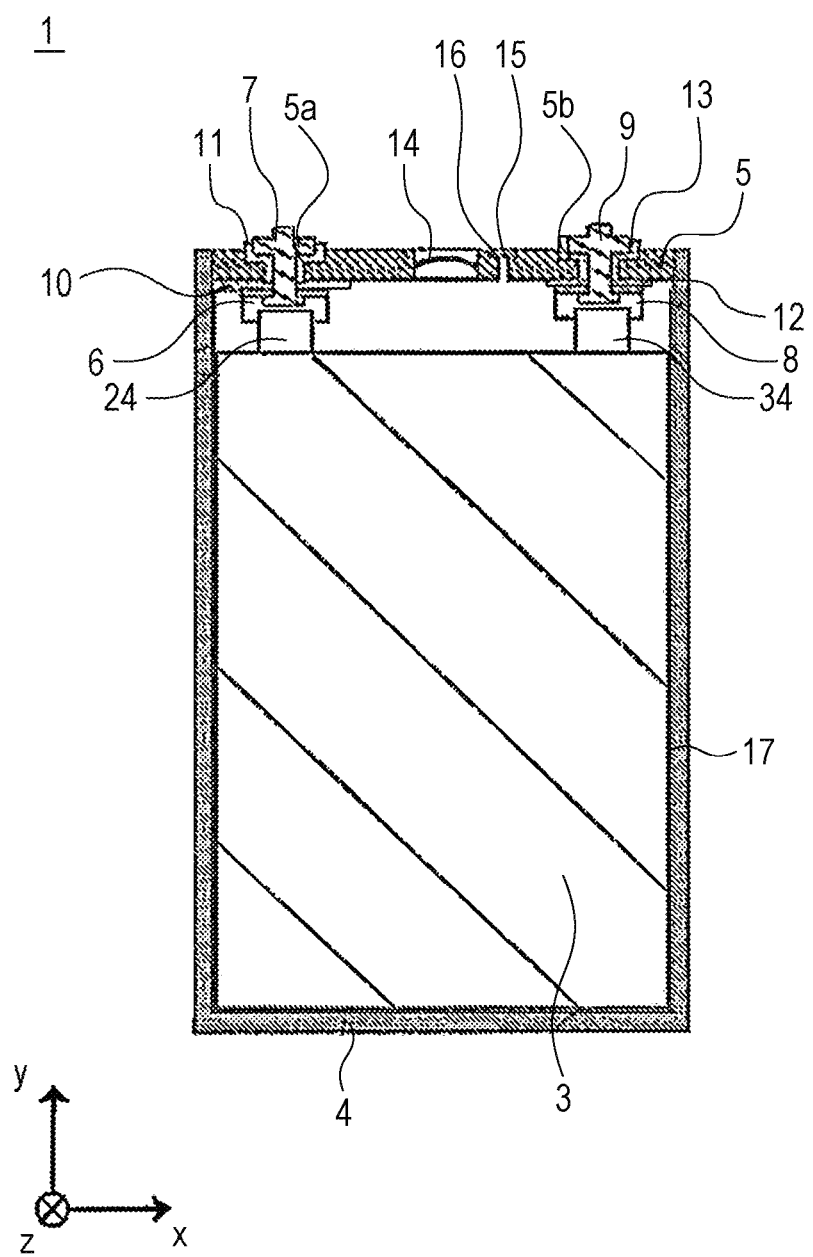
FIG. 1 is a cross-sectional view illustrating the configuration of a lithium-ion battery of an exemplary embodiment.

In a lithium-ion battery, lithium metal deposition on the electrode surface causes a short-circuit between electrodes, falling off of an active material, deterioration in battery life and charge/discharge efficiency, and so forth. Accordingly, preventing such lithium metal deposition is an important object in a lithium-ion battery. In particular, it is considered still more important in view of safety to prevent lithium metal deposition in a lithium-ion battery with an enhanced volume energy density due to an increased filling density of the positive electrode active material.

As in the foregoing, in a lithium-ion battery that includes an electrode assembly having a stacked structure of positive electrodes and negative electrodes, the present inventors found a problem in which lithium metal deposition on the electrode surface results from expansion and contraction of a tab section that is provided on either of the electrodes due to expansion and contraction of an active material layer of the other electrode through charge/discharge cycles. Against such a backdrop, the present inventors found, in a lithium-ion battery comprising an electrode assembly including a first electrode and a second electrode, where the first electrode includes a substrate, a first active material layer formed on a surface of the substrate, and a first tab section having a substrate-exposed portion in which the first active material layer is not formed on the surface, that the above-mentioned problem can be resolved by providing a notch on the first active material layer in an end of the first active material layer such that an outer edge of the notch encloses an end of a boundary where the first tab section and the first active material layer come into contact.

Hereinafter, exemplary embodiments of the present disclosure will be described in detail. A lithium-ion battery according to the present disclosure, however, is not limited to the embodiments described hereinafter. Since the drawings referred to in the description of the embodiments are schematically illustrated, dimensional ratios and the like of the components depicted in the drawings should be judged by taking account of the following description.

[Lithium-Ion Battery]

FIG. 1 is a cross-sectional view illustrating the configuration of a lithium-ion battery (hereinafter, also referred to as "battery 1") of an exemplary embodiment. The battery 1 includes a flat-bottomed case 4 having an opening and a sealing plate 5 for closing the opening. The case 4 is a flat-bottomed square tube container and houses a stacked electrode assembly 3 including positive electrodes and negative electrodes (not shown in FIG. 1) together with a nonaqueous electrolyte (not shown). The sealing plate 5 is a lid for closing the opening of the case 4 and is provided with a positive terminal 7, a negative terminal 9, a gas release valve 14, an electrolyte solution feed port 15 for feeding an electrolyte solution, and a sealing plug 16 for sealing the electrolyte solution feed port 15. The gas release valve 14 breaks when the battery internal pressure reaches a predetermined value or higher and acts to release a gas inside the battery.

Figure 2:
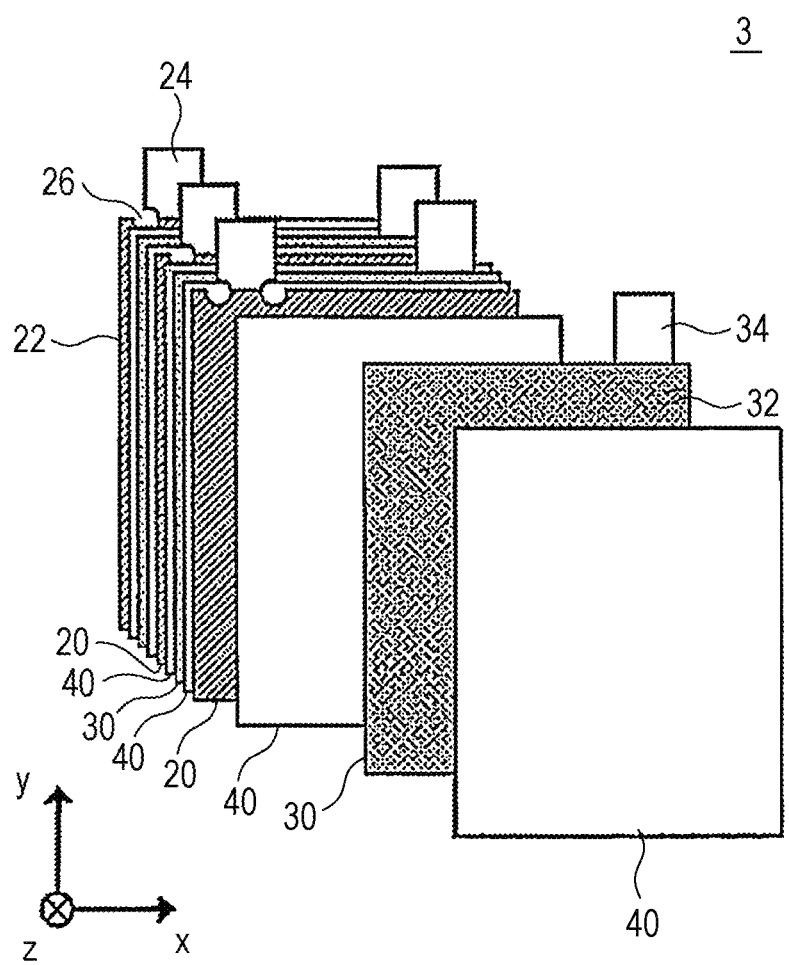
FIG. 2 is a schematic view illustrating an electrode assembly of an exemplary embodiment.
Figure 3:
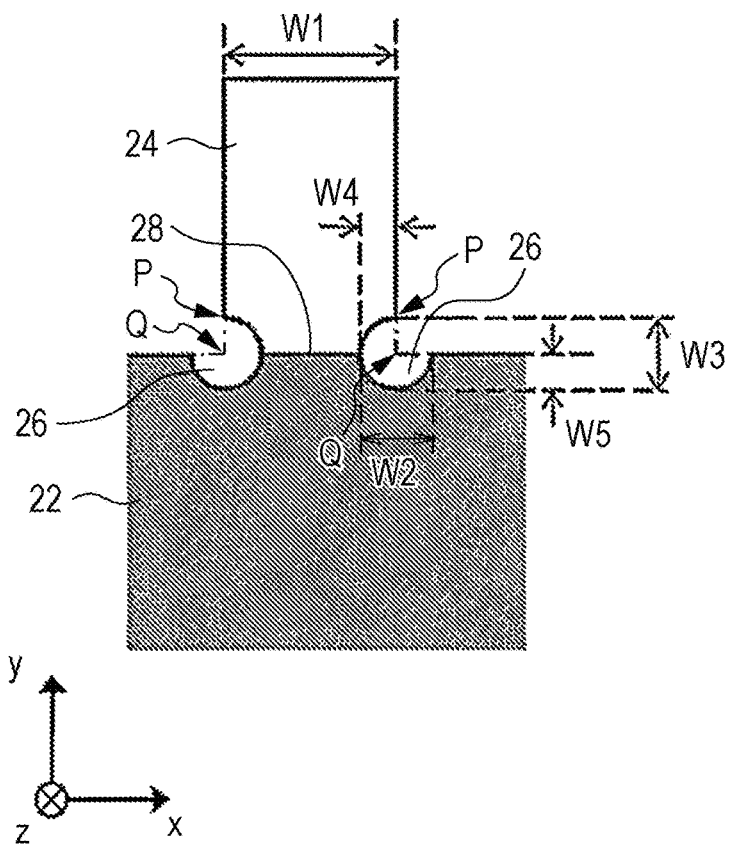
FIG. 3 is a partially enlarged view illustrating the configuration of a positive electrode and a positive tab section according to the exemplary embodiment.

In FIGS. 1 to 3, the z-axis is defined as the stacking direction of the electrode assembly 3, the x-axis is defined as a direction along the side of the case 4 provided with the positive terminal 7 and the negative terminal 9, and the y-axis is defined as a direction orthogonal to each of the x-axis and the z-axis.

The positive terminal 7 acts to electrically connect an external element to the positive electrode, and the negative terminal 9 acts to electrically connect an external element to the negative electrode. The positive terminal 7 is mounted on the sealing plate 5 through a positive terminal mounting hole 5a provided on the sealing plate 5 while being electrically insulated from the sealing plate 5 by insulators 10 and 11. The insulator 10 is disposed on the inner battery side (negative y-axis direction) of the positive terminal mounting hole 5a, and the insulator 11 is disposed on the outer battery side (positive y-axis direction) of the positive terminal mounting hole 5a. Meanwhile, the negative terminal 9 is mounted on the sealing plate 5 through a negative terminal mounting hole 5b provided on the sealing plate 5 while being electrically insulated from the sealing plate 5 by insulators 12 and 13. The insulator 12 is disposed on the inner battery side (negative y-axis direction) of the negative terminal mounting hole 5b, and the insulator 13 is disposed on the outer battery side (positive y-axis direction) of the negative terminal mounting hole 5b. These insulators 10 to 13 are preferably formed from resins.

The electrode assembly 3 whose side and bottom surfaces are covered with an insulating sheet 17 is housed in the case 4. As the insulating sheet 17, it is preferable to use a sheet folded into a box shape along the inner walls of the case 4 or a bag-like sheet that covers the electrode assembly 3.

In the electrode assembly 3, a positive tab section 24 is disposed at either end and a negative tab section 34 at the other end in the x-axis direction of the horizontal side of the electrode assembly 3 on the side of the sealing plate 5 (positive y-axis direction). The end of the positive tab section 24 in the positive y-axis direction is bonded with a positive electrode current collector 6, and the end of the negative tab section 34 in the positive y-axis direction is bonded with a negative electrode current collector 8. The positive electrode current collector 6 is electrically connected with the positive terminal 7, and the negative electrode current collector 8 is electrically connected with the negative terminal 9. A breaking mechanism may be provided in a conduction path between the positive electrode and the positive terminal 7 or in a conduction path between the negative electrode and the negative terminal 9. The breaking mechanism operates when the battery internal pressure reaches a predetermined value or higher and acts to break the conduction path. The working pressure of the breaking mechanism is preferably set to lower than the working pressure of the gas release valve.

[Electrode Assembly]

Hereinafter, the configuration of an electrode assembly 3 according to the present embodiment will be described. FIG. 2 is a schematic view illustrating the configuration of the electrode assembly 3 according to the present embodiment. As illustrated in FIG. 2, the electrode assembly 3 according to the present embodiment is a stacked electrode assembly formed by alternately stacking a plurality of positive electrodes 20 and a plurality of negative electrodes 30 via separators. Each positive electrode 20 and each negative electrode 30 have a flat shape without curving.

The positive electrode 20 (first electrode) is composed of a positive electrode substrate (not shown) and a positive electrode active material layer 22 (first active material layer) formed on the surface of the positive electrode substrate. At either end of the horizontal side of the positive electrode 20 in the positive y-axis direction, the positive tab section 24 (first tab section), which is a positive electrode substrate-exposed portion where the positive electrode active material layer 22 is not formed, is provided. Meanwhile, the negative electrode 30 (second electrode) is composed of a negative electrode substrate (not shown) and a negative electrode active material layer 32 (second active material layer) formed on the surface of the negative electrode substrate. At the end of the horizontal side in the positive y-axis direction on the side where the positive electrode tab section 24 is not provided, the negative tab section 34, which is a negative electrode substrate-exposed portion where the negative electrode active material layer 32 is not formed, is provided. Further, in the positive electrode 20 of the electrode assembly 3 according to the present embodiment, the positive electrode active material layer 22 has notches 26 in the end of the positive electrode active material layer 22 that has the positive tab section 24. The notches 26 will be described in detail hereinafter.

In the stacked electrode assembly 3 according to the present embodiment, dead space is smaller than a wound electrode assembly that is formed by winding a positive electrode and a negative electrode; and cracking or the like in the positive electrode active material layer dose not results from folding of the positive electrode as in the wound electrode assembly. Accordingly, by employing the stacked electrode assembly 3, it is possible to further increase the filling density of a positive electrode active material in the positive electrode active material layer, thereby further enhancing the energy density of the battery 1.

Hereinafter, the features of the notches 26 and the positive tab section 24 provided on the positive electrode 20 as the first electrode according to the present embodiment will be described in detail with reference to FIG. 3. FIG. 3 is a partially enlarged view illustrating the configuration near the positive tab section 24 of the positive electrode 20. The positive tab section 24 extends from either end of the horizontal side of the positive electrode 20 in the positive y-axis direction towards the positive y-axis direction and has an almost rectangular shape.

The width W1 of the positive tab section 24 in the x-axis direction in a region where the notches 26 are not formed is preferably 10 mm or more and more preferably 15 mm or more. When the width W1 of the positive tab section 24 in such a region falls within these ranges, it is possible to achieve low electric resistance, suppress heat generation during high-rate charge/discharge, as well as to enhance the strength of the joining portion with the positive electrode current collector 6. Meanwhile, the width W1 of the positive tab section 24 is preferably 30 mm or less and more preferably 20 mm or less. When the width W1 of the positive tab section 24 falls within these ranges, it is possible to suppress the occurrence of creases and bending in the positive tab section 24 associated with charge/discharge and, as a result, to prevent lithium deposition and expansion of the electrode assembly 3 during charge/discharge.

As illustrated in FIG. 3, the notches 26 are provided on the positive electrode active material layer 22 in the end of the positive electrode active material layer 22, and the outer edge of each notch 26 encloses an end of a boundary 28 where the positive tab section 24 and the positive electrode active material layer 22 come into contact. The notch 26 is formed in a region that encloses an intersection Q between the shape when the notch 26 is not provided on the positive electrode active material layer 22 (represented by a dot-dash line in FIG. 3) and the side of the positive electrode active material layer 22 from which the positive tab section 24 extends (intersection Q between the end of the positive electrode active material layer 22 and the end of the positive tab section 24).

In the present embodiment, by providing a notch 26 on the positive electrode active material layer 22, it is possible to suppress the occurrence of bending and creases in the positive tab section 24 due to reduced stress generated through expansion/contraction of the positive tab section 24 even when a negative electrode active material layer 32 of a facing negative electrode 30 via a separator 40 expands and contracts associated with charge/discharge. As a result, a phenomenon in which the positive electrode 20 curves and partially increases an interelectrode distance between the positive electrode 20 and the negative electrode 30 can be suppressed. Since partial widening of the interelectrode distance can be suppressed, it is possible to prevent lithium metal deposition on the surface of the positive electrode 20 due to increased electric resistance in the corresponding portion.

Moreover, bending or creases that occur in the positive tab section 24 cause curving of the positive electrode 20 and, by extension, an increased thickness in the stacking direction (herein, also referred to as "expansion") of the electrode assembly 3 as a whole. When such expansion occurs in the electrode assembly 3, it is considered that cracking and/or fracture occur in the electrodes that constitute the electrode assembly 3, thereby causing deterioration in life and output characteristics of the battery 1. In the present embodiment, as in the foregoing, it is possible to suppress bending and creases that could occur in the positive tab section 24 through charge/discharge by providing a notch 26 on the positive electrode active material layer 22. Accordingly, it is possible to suppress curving of the positive electrode 20 as well as expansion in the stacking direction of the electrode assembly 3. As a result, it becomes possible to prevent cracking and fracture in the electrodes that constitute the electrode assembly 3 and to suppress deterioration in life and output characteristics of the battery 1.

In FIG. 3, the notches 26 have a circular arc shape when viewed from the stacking direction (z direction), but the shape of the notches 26 is not particularly limited in the present disclosure. In a case in which the outer edge of a notch 26 is a circular arc or an elliptical arc when viewed from the stacking direction, the notch 26 can prevent cracking and fracture due to stress concentration on a certain portion of the notch 26 even when the positive tab section 24 is compressed during charging.

Hereinafter, an exemplary suitable size of the notch 26 when viewed from the stacking direction will be described. However, the notch 26 is not limited to a notch having the following size and may be appropriately determined in view of the balance, for example, between suppressive effects on the occurrence of creases and bending by the formation of a notch 26; and an increase in electric resistance in the positive tab section 24 as well as lowering in capacity in the positive electrode active material layer 22.

The width W2 of the notch 26 in the x-axis direction is preferably 15 mm or less and more preferably 10 mm or less. When the width W2 falls within these ranges, it is possible to suppress lowering in capacity of the positive electrode 20 due to a decreased area of the positive electrode active material layer 22 to be formed. Meanwhile, the width W2 of the notch 26 in the x-axis direction is preferably 3 mm or more and more preferably 6 mm or more. When the width W2 falls within these ranges, there are advantages; even when the positive tab section 24 is bent during assembling of a battery or by vibration, it is possible to suppress displacement onto the positive tab section 24 or the positive electrode 20 of the terminal edge P (shown in FIG. 3) of the notch 26 on the side of the positive tab section 24 (positive y-axis direction side) and to suppress short-circuiting between positive and negative electrodes due to breakage of a separator caused by stress applied between the displaced terminal edge P and the separator.

The width W3 of the notch 26 in the y-axis direction is preferably 3 mm or more and more preferably 6 mm or more. When the width W3 falls within these ranges, preventive effects on the occurrence of creases and bending of the positive tab section 24 due to the provided notch 26 are further enhanced. Meanwhile, the width W3 of the notch 26 in the y-axis direction is preferably 15 mm or less and more preferably 10 mm or less. When the width W3 falls within these ranges, it is possible to reduce an increase in electric resistance due to the narrowed width of the positive tab section 24 and to raise the upper limit of allowable current in view of heat generation, thereby achieving advantageous high-rate characteristics of the battery 1.

The depth W4 in the x-axis direction of a region in which the positive tab section 24 is cut as the notch 26 is preferably 1 mm or more and more preferably 3 mm or more. When the width W4 falls within these ranges, preventive effects on the occurrence of creases and bending of the positive tab section 24 by the provided notch 26 are further enhanced. Meanwhile, the depth W4 in the x-axis direction of the region in which the positive tab section 24 is cut as the notch 26 is preferably 5 mm or less and more preferably 8 mm or less. When the width W4 falls within these ranges, it is possible to reduce an increase in electric resistance due to the narrowed width of the positive tab section 24 and to raise the upper limit of allowable current in view of heat generation, thereby achieving advantageous high-rate characteristics of the battery 1.

The depth W5 in the y-axis direction of a region in which the positive electrode active material layer 22 is cut as the notch 26 is preferably 1 mm or more and more preferably 3 mm or more. When the width W5 falls within these ranges, stress on the positive tab section 24 pulled by the positive electrode active material layer 22 is reduced. Meanwhile, the depth W5 in the y-axis direction of the region in which the positive electrode active material layer 22 is cut as the notch 26 is preferably 5 mm or less and more preferably 8 mm or less. When the width W5 falls within these ranges, it is possible to suppress lowering in capacity of the positive electrode 20 due to a decreased area of the positive electrode active material layer 22 to be formed.

The ratio of the depth W4 in the x-axis direction of a region in which the positive tab section 24 is cut as the notch 26 to the width W2 of the notch 26 in the x-axis direction is preferably 30% or more and more preferably 50% or more. When the ratio increases, preventive effects on the occurrence of creases and bending of the positive tab section 24 by the provided notch 26 are further enhanced.

The ratio of the depth W5 in the y-axis direction of a region in which the positive electrode active material layer 22 is cut as the notch 26 to the width W3 of the notch 26 in the y-axis direction is preferably 30% or more and more preferably 50% or more. When the ratio increases, stress on the positive tab section 24 pulled by the positive electrode active material layer 22 is reduced.

Further, when the outer edge of the notch 26 is a circular arc as illustrated in FIG. 3, the circular arc is preferably a part of a circle with a radius of ⅕ or more and ⅓ or less of the width W1 of the positive tab section 24 or a part of a circle with a radius of 3 mm or more and 5 mm or less, in view of the foregoing. When the outer edge of the notch 26 is a circular arc, the center of a circle, a part of which the circular arc constitutes, is preferably positioned at an intersection Q (shown in FIG. 3) between the extended line of the vertical side of the positive tab section 24 that has the notch 26 and the extended line of the horizontal side of the positive electrode active material layer 22 on which the positive tab section 24 is provided.

Figure 4:
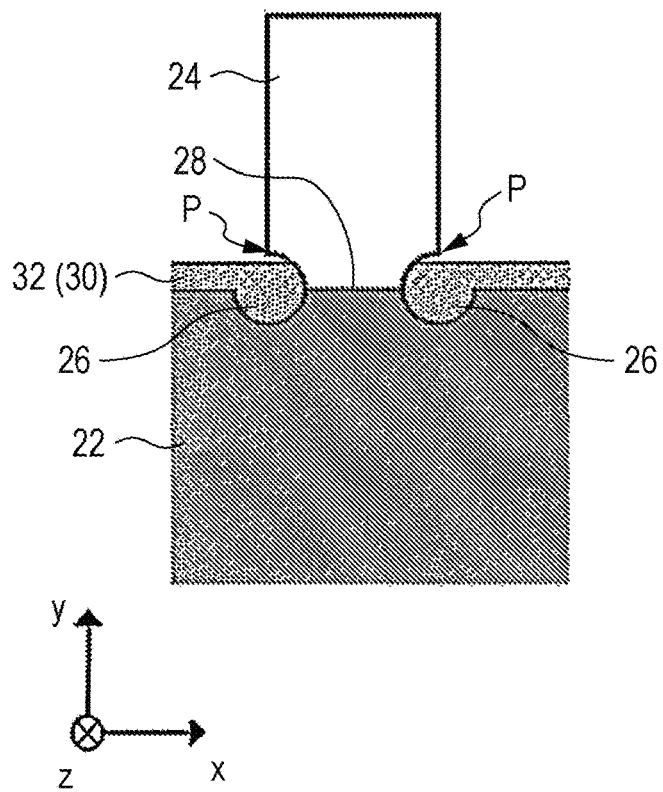
FIG. 4 illustrates a positional relationship between the positive electrode and a negative electrode in the exemplary embodiment.

FIG. 4 illustrates a positional relationship between the positive electrode 20 and the negative electrode 30 in a produced stacked electrode assembly 3. In the present embodiment, in the stacked electrode assembly 3 as illustrated in FIG. 4, the terminal edge P of the notch 26 in the positive electrode 20 on the side of the positive tab section 24 (positive y-axis direction side) is preferably placed at a position that does not overlap the negative electrode active material layer 32 of the negative electrode 30 when viewed from the stacking direction. When a positive electrode 20 having a notch 26 that is formed such that the terminal edge P of the notch 26 is positioned without overlapping the negative electrode active material layer 32 is employed, a lithium-ion battery with further excellent suppressive effects on lithium metal deposition at the negative electrode 30 can be obtained. Such suppressive effects on lithium metal deposition are particularly remarkable during high-rate charge/discharge. The reason is not obvious, but presumably because even when the negative electrode active material layer 32 expands or contracts while pushing the positive tab section 24 via a separator 40, for example, the positive tab section 24 expands/contracts to slide along the shape of the notch 26 on the side of the negative y-axis direction from the terminal edge P, and consequently, force that causes creases and bending in the positive tab section 24 is not applied. For the same reason, when the terminal edge P of the notch 26 is placed at a position that does not overlap the negative electrode active material layer 32, expansion of the electrode assembly 3 in the stacking direction can be suppressed.

Two notches 26 are preferably provided at both ends of a boundary 28 where the positive tab section 24 and the positive electrode active material layer 22 come into contact. Compared with a case in which a notch 26 is provided at only either end of the boundary 28 where the positive tab section 24 and the positive electrode active material layer 22 come into contact, corners on which stress is concentrated when the positive tab section 24 expands/contracts through charge/discharge are reduced. As a result, it is possible to suppress the occurrence of bending and creases in the positive tab section 24 and to prevent cracking and fracture in the positive electrode 20.

When notches 26 are provided at both ends of the boundary 28 where the positive tab section 24 and the positive electrode active material layer 22 come into contact, the positive electrode active material layer 22 or a protective layer described hereinafter is preferably formed on the straight line that connects these notches 26 at a shortest distance. As a result, the portion that connects the two notches 26 at a shortest distance, which is a spot where stress is concentrated during expansion/contraction of the positive tab section 24, is reinforced. Accordingly, cracking and fracture that starts from the notches 26 can be effectively prevented.

In the present embodiment, an example in which a notch 26 is provided in the end of the positive electrode active material layer 22 that has the positive tab section 24 is described. However, a similar notch may be provided in the end of the negative electrode active material layer 32 that has the negative tab section 34. Alternatively, notches may be provided on both the positive electrode active material layer 22 and the negative electrode active material layer 32. When a notch is provided on the negative electrode active material layer 32, advantageous effects similar to the notch 26 provided on the positive electrode active material layer 22 are considered to be obtained as well.

Hereinafter, the configuration, materials, and the like of a positive electrode 20, a negative electrode 30, a separator 40, and a nonaqueous electrolyte that constitute the battery 1 according to the present embodiment will be described in detail. However, such a description is a mere example, and publicly known components may be used as the positive electrode 20, the negative electrode 30, the separator 40, and the nonaqueous electrolyte.

[Positive Electrode]

The positive electrode 20 includes a positive electrode substrate and a positive electrode active material layer 22. Examples of the positive electrode substrate include: a foil of a metal that is stable within the potential range of the positive electrode, such as elemental aluminum or an aluminum alloy; and a film having such a metal as the surface layer. The thickness of the positive electrode substrate is not particularly limited, but is about 10 μm or more and 100 μm or less, for example.

The positive electrode active material layer 22 contains a positive electrode active material consisting of a lithium transition metal complex oxide, for example. Examples of the lithium transition metal complex oxide include lithium transition metal complex oxides containing lithium (Li) as well as transitions metals, such as cobalt (Co), manganese (Mn), and nickel (Ni). Preferably, at least one of Co, Mn, and Ni is contained. Such a lithium transition metal complex oxide may contain an additive element other than Co, Mn, and Ni. Examples of other additive elements include aluminum (Al), zirconium (Zr), boron (B), magnesium (Mg), scandium (Sc), yttrium (Y), titanium (Ti), iron (Fe), copper (Cu), zinc (Zn), chromium (Cr), lead (Pb), tin (Sn), sodium (Na), potassium (K), barium (Ba), strontium (Sr), calcium (Ca), tungsten (W), molybdenum (Mo), niobium (Nb), and silicon (Si).

Specific examples of the lithium transition metal complex oxides include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, and $Li_2MPO_4F$ (in each chemical formula, M is at least one of Na, Mg, Sc, Y, Mn, Fe, Co, Ni, Cu, Zn, Al, Cr, Pb, Sb, and B; $0<x\leq1.2$; $0<y\leq0.9$; $2.0\leq z\leq2.3$). These oxides may be used alone or as mixtures.

The positive electrode active material layer 22 suitably further contains a conductive material and a binder. The conductive material contained in the positive electrode active material layer 22 is used to enhance electric conductivity of the positive electrode active material layer 22. Examples of the conductive material include carbon materials, such as carbon black (CB), acetylene black (AB), Ketjen black, and graphite. These conductive materials may be used alone or in combination.

The binder contained in the positive electrode active material layer 22 is used to maintain good contact state between the positive electrode active material and the conductive material as well as to enhance binding properties of the positive electrode active material and the like to the surface of the positive electrode substrate. Examples of the binder include polyvinylidene fluoride (PVDF), polytetrafluoroethylene (PTFE), polyethylene, polypropylene, aramid resins, polyamides, polyimides, polyamide-imides, polyacrylonitrile (PAN), polyacrylic acid, polymethyl acrylate, polyethyl acrylate, polyhexyl acrylate, polymethacrylic acid, polymethyl methacrylate, polyethyl methacrylate, polyhexyl methacrylate, polyvinyl acetate, polyvinylpyrrolidone, polyethers, polyether-sulfones, polyhexafluoropropylene, styrene-butadiene rubber, carboxymethyl cellulose (CMC) and salts thereof (CMC-Na, CMC-K, $CMC-NH_4$, and so forth; or may be partially neutralized salts), acrylic rubber, and acrylate binders (esters or salts of acrylic acid). These binders may be used alone or in combination.

The content ratio of the positive electrode active material in the positive electrode active material layer 22 is not particularly limited but is preferably 95% by mass or more and 99% by mass or less relative to the total amount of the positive electrode active material layer 22. The content ratio of the conductive material in the positive electrode active material layer 22 is preferably 0.5% by mass or more and 3% by mass or less relative to the total amount of the positive electrode active material layer 22. The content ratio of the binder in the positive electrode active material layer 22 is preferably 0.5% by mass or more and 3% by mass or less relative to the total amount of the positive electrode active material layer 22.

The filling density of the positive electrode active material in the positive electrode active material layer 22 of the positive electrode 20 may be appropriately selected according to the uses and the like of the battery 1 and is not particularly limited. For example, the positive electrode 20 having a filling density of the positive electrode active material of 3.5 $g/cm^2$ or more is suitable since a lithium-ion battery with a high energy density can be produced. In a lithium-ion battery with a high energy density, current of higher than the conventional rate is generated. Accordingly, the positive electrode 20 according to the present embodiment that has a notch 26 provided on the positive tab section 24 is considered further effective in the use for a battery 1 with a high energy density.

A protective layer may be provided in a region of the root portion of the positive tab section 24 that is in contact with the positive electrode active material layer 22. By providing a protective layer, it is possible to reinforce the notch 26 on the side of the positive tab section 24 and effectively prevent the occurrence of fracture and cracking that start from the notch 26. Moreover, when a protective layer is provided, the protective layer preferably covers the terminal edge of the notch 26 on the positive y-axis direction side. As a result, it is possible to reliably prevent the terminal edge from penetrating a separator to come into contact with a negative electrode 30.

The protective layer may be solely composed of a binder or may be composed of a binder and ceramic particles. Exemplary binders used for the protective layer include the above-described binders that may be contained in the positive electrode active material layer 22. A binder contained in the positive electrode active material layer 22 and a binder contained in the protective layer may be the same or different. The content ratio of a binder in the protective layer may be 5% by mass or more, for example, and is preferably 8% by mass or more and more preferably 10% by mass or more. When the protective layer contains components other than the binder, the content ratio of the binder in the protective layer may be 95% by mass or less, for example.

Examples of the ceramic particles contained in the protective layer include alumina, zirconia, titania, and silica. The content ratio of the ceramic particles in the protective layer may be 50% by mass or more, for example, and is preferably 80% by mass or less. Moreover, the protective layer may contain a conductive material. Exemplary conductive materials used for the protective layer include the above-described conductive materials that may be contained in the positive electrode active material layer 22. The content ratio of the conductive material in the protective layer is adjusted such that the electric conductivity of the protective layer is lower than that of the positive electrode active material layer 22 and is 5% by mass or less, for example.

[Negative Electrode]

The negative electrode 30 is composed of a negative electrode substrate consisting of a metal foil, for example, and a negative electrode active material layer 32 formed on the surface of the negative electrode substrate. Examples of the negative electrode substrate include: a foil of a metal that is stable within the potential range of the negative electrode, such as copper; and a film having such a metal as the surface layer. Preferably, the negative electrode substrate is a copper foil or a copper alloy foil. The negative electrode active material layer 32 suitably contains a binder, in addition to the negative electrode active material. The negative electrode 30 can be produced, for example, by applying a negative electrode active material layer slurry containing a negative electrode active material, a binder, and the like to the surfaces of a negative electrode substrate, drying the resulting coating layers, followed by rolling to form negative electrode active material layers 32 on both surfaces of the current collector.

The negative electrode active material is not particularly limited provided that lithium ions can be reversibly adsorbed and desorbed. Examples of the negative electrode active material include carbon materials, such as natural graphite and artificial graphite; metals that form alloys with lithium, such as silicon (Si) and tin (Sn); and alloys and complex oxides containing metal elements, such as Si and Sn. These negative electrode active materials may be used alone or in combination.

As the binder contained in the negative electrode active material layer 32, fluoro resins, PAN, polyimide resins, acrylic resins, and polyolefin resins, for example, may be used as in the case of the positive electrode 20. When the negative electrode active material layer slurry is prepared by using an aqueous solvent, it is preferable to use, as a binder, styrene-butadiene rubber (SBR), CMC or a salt thereof, polyacrylic acid (PAA) or a salt thereof (PAA-Na, PAA-K, and so forth; or may be a partially neutralized salt), or polyvinyl alcohol (PVA), for example.

The negative electrode 30 has a rectangular shape similar to the positive electrode 20, for example. To ensure smooth movement of lithium ions between the electrodes, it is preferable to form the negative electrode active material layer 32 of the negative electrode 30 in a size larger than the size of the positive electrode active material layer 22 of the positive electrode 20 as well as to dispose the negative electrode active material layer 32 to enclose the positive electrode active material layer 22 when viewed from the stacking direction. For example, in the battery 1 that houses the electrode assembly 3, it is preferable, when viewed from the stacking direction, that the horizontal side of the negative electrode active material layer 32 provided with the negative tab section 34 extend outside (positive y-axis direction) the horizontal side of the positive electrode active material layer 22 provided with the positive tab section 24 within the range of 3 mm or less.

The thickness of the negative electrode 30 is not particularly limited but is preferably 60 µm or more and 100 µm or less. The negative electrode 30 can be manufactured by applying a negative electrode mixture slurry containing a negative electrode active material, a binder, and the like to a long negative electrode current collector, rolling the resulting coatings to form negative electrode active material layers on both surfaces of the current collector, followed by cutting into a predetermined size for the negative electrode 30.

[Separator]

As a separator 40, an ion-permeable insulating porous sheet or the like is used. Specific examples of the porous sheet include microporous membranes, woven fabrics, and nonwoven fabrics. Exemplary constituent materials of the separator 40 include cellulose and olefin resins, such as polyethylene and polypropylene. The separator 40 may be a layered structure including a cellulose fiber layer and a thermoplastic resin fiber layer made from an olefin resin or the like. Moreover, the separator 40 may be a multilayer separator including a polyethylene layer and a polypropylene layer or the separator 40 may be surface-coated with an aramid resin, ceramic, or the like. The thickness of the separator 40 is not particularly limited but is preferably 10 µm or more and 30 µm or less.

In the present embodiment, the electrode assembly 3 has the configuration in which a plurality of flat separators are used between the respective positive electrodes 20 and negative electrodes 30. However, the shape of the separator is not limited provided that the separator is ion-permeable and insulating. For example, a bag-like separator that houses either of the electrodes or a zigzag-shape separator may be used.

[Nonaqueous Electrolyte]

A nonaqueous electrolyte contains a nonaqueous solvent and an electrolyte salt dissolved in the nonaqueous solvent. Examples of the nonaqueous solvent include esters; ethers; nitriles, such as acetonitrile; amides, such as dimethylformamide; and mixed solvents thereof. The nonaqueous solvents may include halogenated solvents, in which hydrogen of these solvents is at least partially replaced with halogen atoms, such as fluorine. As the nonaqueous electrolyte, a solid electrolyte formed of a gel polymer, for example, may be used.

Examples of the esters include cyclic carbonate esters, such as ethylene carbonate (EC), propylene carbonate (PC), and butylene carbonate; linear carbonate esters, such as dimethyl carbonate (DMC), methyl ethyl carbonate (EMC), diethyl carbonate (DEC), methyl propyl carbonate, ethyl propyl carbonate, and methyl isopropyl carbonate; cyclic carboxylic acid esters, such as γ-butyrolactone and γ-valerolactone; and linear carboxylic acid esters, such as methyl acetate, ethyl acetate, propyl acetate, methyl propionate (MP), ethyl propionate, and γ-butyrolactone.

Examples of the ethers include cyclic ethers, such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ethers; and linear ethers, such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

As the halogenated solvents, it is preferable to use fluorinated cyclic carbonate esters, such as fluoroethylene carbonate (FEC); fluorinated linear carbonate esters; and fluorinated linear carboxylic acid esters, such as methyl fluoropropionate (FMP).

The electrolyte salt of the nonaqueous electrolyte is preferably a lithium salt. Examples of the lithium salt include $LiBF_4$; $LiClO_4$; $LiPF_6$; $LiAsF_6$; $LiSbF_6$; $LiAlCl_4$; LiSCN; $LiCF_3SO_3$; $LiCF_3CO_2$; $Li(P(C_2O_4)F_4)$; $LiPF_{6-x}(C_nF_{2n+1})_x$ (1<x<6; n is 1 or 2), $LiB_{10}Cl_{10}$; LiCl; LiBr; LiI; chloroborane lithium complex; a lower aliphatic carboxylic acid lithium salt; borates, such as $Li_2B_4O_7$ and $Li(B(C_2O_4)F_2)$; and imide salts, such as $LiN(SO_{34}F_3)_2$ and $LiN(C_{26 2l+1}SO_2)(C_mF_{2m+1}SO_2)$ (l and m are each independently an integer of 1 or more). These lithium salts may be used alone or in combination. Among these lithium salts, $LiPF_6$ is preferably used in view of ion conductivity, electrochemical stability, and so forth. The concentration of the lithium salt is preferably set to 0.5 mol or more and 2.0 mol or less per L of the nonaqueous solvent.

[Manufacturing Method for Battery]

Hereinafter, a manufacturing method for the battery 1 according to the present embodiment will be described.

(Production of Positive Electrode)

The positive electrode 20 according to the present embodiment is manufactured, for example, by applying a positive electrode active material layer slurry containing a positive electrode active material, a conductive material, a binder, and the like to a strip-shape positive electrode substrate, drying and rolling the resulting coatings to form positive electrode active material layers 22 on both surfaces of the positive electrode substrate, followed by cutting into a predetermined size. Here, the positive electrode active material layer slurry is not applied to a portion of the positive electrode substrate that forms the positive tab section 24. The application method for the positive electrode active material layer slurry is not particularly limited provided that the method is a publicly known method, and examples include roll coating, bar coating, gravure coating, and die coating.

The rolling method for the coatings of the positive electrode active material layer slurry formed on both surfaces of the positive electrode substrate may be any publicly known method and is performed by passing through a pair of press rollers, for example. In the production of the positive electrode 20, a positive electrode 20 with a high filling density of the positive electrode active material can be produced by adjusting the composition, the amount applied, and so forth of the positive electrode active material layer slurry and by compressing dry coatings under high pressure (200 MPa or higher, for example). The filling density in the positive electrode active material layer 22 is preferably set to 3.5 g/cm$^3$ or more from a viewpoint of enhancing the energy density of a lithium-ion battery.

In the positive electrode 20, when a protective layer is formed in a positive electrode substrate-exposed portion where the positive electrode active material layer 22 is not formed, such a protective layer is formed by applying a protective layer slurry containing ceramic particles, a conductive material, a binder, and a dispersion medium, followed by drying. The protective layer may be formed simultaneously with or separately from the formation of the positive electrode active material layer 22.

The means to be employed for cutting the positive electrode substrate, on both surfaces of which the positive electrode active material layers 22 have been formed, may be any cutting means publicly known in the field of electrode manufacture, and examples include a mold press, a cutter, and a laser. Similarly, the means to cut the positive electrode substrate-exposed portion where the positive electrode active material layer 22 is not formed into a predetermined shape, thereby forming the positive tab section 24 and the notch 26 may also be any publicly known cutting means. Examples of such cutting means include a mold press, a cutter, and a laser.

The positive tab section 24 and the notch 26 may be formed simultaneously or separately. Moreover, the positive tab section 24 and the notch 26 may be formed by different methods. For example, the positive tab section 24 may be formed by press punching, and then the notch 26 may be formed by irradiation. The notch 26 is preferably formed by irradiation with laser or the like. As a result, the edge of the notch 26 (cross-section in the z-axis direction) has a further rounded shape rather than a sharp shape. Accordingly, it is possible to further reliably prevent formation of a point from which cracking starts when the positive tab section 24 expands/contracts associated with charge/discharge.

(Production of Negative Electrode)

The negative electrode 30 is manufactured, for example, by applying a negative electrode active material layer slurry containing a negative electrode active material, a conductive material, a binder, and the like to a strip-shape negative electrode substrate, drying and rolling the resulting coatings to form negative electrode active material layers 32 on both surfaces of the negative electrode substrate, followed by cutting into a predetermined size. Here, the negative electrode active material layer slurry is not applied to a portion of the negative electrode substrate that forms the negative tab section 34. The application method for the negative electrode active material layer slurry, the rolling method for the coatings, the cutting method for the negative electrode substrate where the negative electrode active material layers 32 have been formed, and the like may be performed similarly to the above-described production of the positive electrode.

(Production of Electrode Assembly)

The stacked electrode assembly 3 illustrated in FIG. 2 is produced, for example, by alternately stacking the positive electrodes 20 and the negative electrodes 30 produced as in the foregoing via separators 40. In the electrode assembly 3, the number of the positive electrodes 20 and the negative electrodes 30 is not particularly limited. For example, the number of the respective electrodes may be set to 10 or more and 70 or less.

In the electrode assembly 3, the positive electrodes 20, the negative electrodes 30, and the separators 40 are preferably fixed in the stacked state. For example, the positive electrodes 20, the negative electrodes 30, and the separators 40 may be fixed by winding a fixing member, such as an insulating tape, around the electrode assembly 3; or the positive electrodes 20, the negative electrodes 30, and the separators 40 may be fixed by adhesive layers provided on the separators 40 through bonding the respective separators 40 and the positive electrodes 20 as well as the respective separators 40 and the negative electrodes 30. As a result, it is possible to prevent stacking misalignment among the positive electrodes 20, the negative electrodes 30, and the separators 40.

(Manufacture of Lithium-Ion Battery)

In the electrode assembly 3 produced as in the foregoing, the positive tab sections 24 protruded from the respective positive electrodes 20 are brought together to be stacked and connected with the positive electrode current collector 6 by welding. In the similar manner, the negative tab sections 34 protruded from the respective negative electrodes 30 are brought together to be stacked and connected with the negative electrode current collector 8 by welding. As the means to connect by welding, a publicly known method, such as resistance welding, laser welding, or ultrasonic welding, may be employed. Subsequently, the electrode assembly 3 covered with an insulating sheet 17 is inserted into a flat-bottomed square tube case 4. The case 4 was then connected with a sealing plate 5 by welding to seal the opening of the case 4. After that, a nonaqueous electrolyte solution containing an electrolyte and a solvent is fed into the case 4 through an electrolyte solution feed port 15 provided on the sealing plate 5. The electrolyte solution feed port 15 is then sealed with a sealing plug 16. As described above, the battery 1 according to the present embodiment is obtained.

In the foregoing, the battery 1 that include the stacked electrode assembly 3 having a plurality of positive electrodes and negative electrodes is described as an example, but the electrode assembly 3 illustrated in FIG. 2 is a mere example. As the electrode assembly according to the present disclosure, the battery 1 may include, for example, a wound electrode assembly produced by winding a strip-shape positive electrode and a strip-shape negative electrode via a separator and forming into a flat, cylindrical, or other shapes. For example, a plurality of positive tab sections provided on the positive electrode and a plurality of negative tab sections provided on the negative electrode are each disposed on either side of the ends of the wound electrode assembly in the winding axis direction, and notches according to the present embodiment are provided on at least either of the positive tab sections and the negative tab sections. In this case, a plurality of the positive tab sections provided on the strip-shape positive electrode are preferably formed at varied intervals, rather than regular intervals, such that a plurality of the positive tab sections are stacked to be connected with the positive electrode current collector after winding. The same holds true for the forming position of a plurality of the negative tab sections provided on the strip-shape negative electrode.

EXAMPLES

Hereinafter, the present disclosure will be further described by means of Examples.

Example 1

[Production of Positive Electrode]

A positive electrode active material layer slurry was prepared by mixing lithium nickel cobalt manganese complex oxide as a positive electrode active material, polyvinylidene fluoride (PVdF) as a binder, a carbon material as a conductive material, and N-methyl-2-pyrrolidone (NMP) as a dispersion medium at a mass ratio of lithium nickel cobalt manganese complex oxide:PVdF:carbon material of 97.5:1:1.5. Subsequently, the positive electrode active material layer slurry was applied to both surfaces of a positive electrode substrate consisting of a m-thick strip-shape aluminum foil by using a die coater. The resulting coatings of the positive electrode active material layer slurry were then dried to form positive electrode active material layers on both surfaces of the positive electrode substrate.

The obtained strip-shape positive electrode substrate where the positive electrode active material layers had been formed was rolled with a press roller. Subsequently, a positive electrode 20 of Example 1 that has the positive tab section 24 and two notches 26 illustrated in FIG. 3 was produced by using a mold. The width W1 of the positive tab section 24 in the x-axis direction was 20 mm. When viewed from the z-axis direction illustrated in FIG. 3, the outer edge of each notch 26 had a shape of a circular arc that constitutes a part of a circle with a radius of 4 mm. Moreover, each notch 26 had a width W2 in the x-axis direction, a width W3 in the y-axis direction, a depth W4 in the x-axis direction of a region in which the positive tab section 24 is cut, and a depth W5 in the y-axis direction of a region in which the positive electrode active material layer 22 is cut of 8 mm, 8 mm, 4 mm, and 4 mm, respectively. The filling density in the positive electrode active material layer 22 was 3.7 g/cm$^3$.

[Production of Negative Electrode] A negative electrode active material layer slurry was prepared by mixing graphite powder as a negative electrode active material, styrene-butadiene rubber (SBR) as a binder, carboxymethyl cellulose (CMC) as a thickener, and water at a mass ratio of graphite powder:SBR:CMC of 98:1:1. Subsequently, the negative electrode active material layer slurry was applied to both surfaces of a negative electrode substrate consisting of a 8 μm-thick strip-shape copper foil by using a die coater. Subsequently, the coatings of the negative electrode active material layer slurry were dried, then rolled with a press roller, and cut into a predetermined shape by using a mold to produce a negative electrode 30 having negative electrode active material layers 32 formed on both surfaces of the negative electrode substrate.

[Production of Nonaqueous Electrolyte]

Ethylene carbonate (EC), methyl ethyl carbonate (EMC), and dimethyl carbonate (DMC) were mixed at a volume ratio of 3:3:4. To the resulting mixed solvent, LiPF$_6$ as an electrolyte was added at a concentration of 1.2 mol/L to produce a nonaqueous electrolyte.

[Production of Battery]

By using 78 layers of positive electrodes 20 and 80 layers of negative electrodes 30 produced by the above-described method, a pair of stacked electrode assemblies 3 were produced by stacking 39 layers of positive electrodes 20 and 40 layers of negative electrodes via polyolefin separators. FIG. 4 illustrates a positional relationship between a positive electrode 20 and a negative electrode 30 in the produced stacked electrode assembly 3. In FIG. 4, a separator 40 is omitted. In the produced electrode assembly 3, the end of the negative electrode active material layer 32 in the positive y-axis direction is disposed to protrude by 3 mm from the end of the positive electrode active material layer 22 in the positive y-axis direction. In other words, as illustrated in FIG. 4, the terminal edges P of the notches 26, which are provided at both ends of a boundary 28 between the positive tab section 24 and the positive electrode active material layer 22 on the side of the positive tab section 24, are disposed at positions that do not overlap the negative electrode active material layer 32 when viewed from the stacking direction (z direction) of the electrodes. The produced pair of electrode assemblies 3 were inserted into a flat-bottomed square tube case 4, and the opening of the case 4 was then sealed by connecting the case 4 with a sealing plate 5 through welding. Subsequently, the above-described nonaqueous electrolyte solution containing an electrolyte and a solvent was fed to the case 4 through an electrolyte solution feed port 15 provided on the sealing plate 5, followed by sealing of the electrolyte solution feed port 15 with a sealing plug 16 to produce a prismatic rechargeable battery A1 of Example 1.

Example 2

A prismatic rechargeable battery A2 of Example 2 was produced according to the method of Example 1 except for producing a positive electrode having notches 26 different in size from the prismatic rechargeable battery A1 by adjusting a mold in the cutting step of the strip-shape positive electrode substrate where the positive electrode active material layers have been formed. The outer edge of each formed notch 26 had a shape of a circular arc that constitutes a part of a circle with a radius of 2 mm when viewed from the z direction illustrated in FIG. 3. Moreover, each notch 26 had a width W2 in the x-axis direction, a width W3 in the y-axis direction, a depth W4 in the x-axis direction of a region in which the positive tab section 24 is cut, and a depth W5 in the y-axis direction of a region in which the positive electrode active material layer 22 is cut of 4 mm, 4 mm, 2 mm, and 2 mm, respectively. The filling density in the positive electrode active material layer 22 was 3.7 g/cm$^3$.

Figure 5:
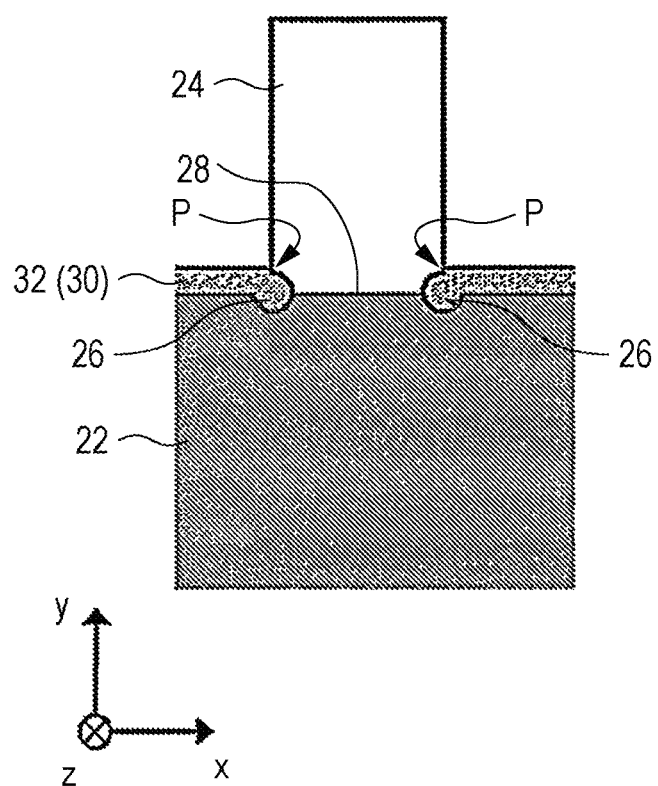
FIG. 5 illustrates a positional relationship between a positive electrode and a negative electrode in another exemplary embodiment.

FIG. 5 illustrates a positional relationship between a positive electrode 20 and a negative electrode 30 in the stacked electrode assembly 3 of the prismatic rechargeable battery A2. In FIG. 5, a separator 40 is omitted. As illustrated in FIG. 5, the prismatic rechargeable battery A2 had notches 26 in size smaller than the notches 26 of the prismatic rechargeable battery A1, and terminal edges P of the notches 26, which are provided at both ends of a boundary 28 between the positive tab section 24 and the positive electrode active material layer 22 on the side of the positive tab section 24, were disposed at positions that overlap the negative electrode active material layer 32 when viewed from the stacking direction (z direction) of the electrodes.

Comparative Example 1

A prismatic rechargeable battery A3 of Comparative Example 1 was produced according to the method of Example 1 except for producing a positive electrode without notches 26 in the root portion of the positive tab section by adjusting a mold in the cutting step of the strip-shape positive electrode substrate where the positive electrode active material layers have been formed.

[Evaluation Test 1]

A charge/discharge cycle test was performed for each battery of the Examples and the Comparative Example. Under a battery temperature condition of 25° C., each battery was charged at a constant current of 0.3It to a voltage value of 4.3 V, then further charged at a constant voltage of 4.3 V to a current value of 0.05It, and subsequently discharged at a constant current of 0.3It to a voltage value of 2.5 V. The discharge capacity (mAh) during the constant-current discharge was set as a rated capacity of each battery.

Next, a charge/discharge cycle test was performed for each battery at a current of 1 C relative to the rated capacity. In other words, under a temperature condition of 25° C., a charge/discharge cycle consisting of constant-current charge at 1 C to 4.3 V (60 minutes), rest for 15 minutes, constant-current discharge at a current of 0.3 C to 2.5 V (60 minutes), and rest for 15 minutes was repeated 200 times for each battery.

After the charge/discharge cycle test, each battery under the discharge state of the voltage value was taken out and disassembled to detach the electrode assembly. Subsequently, the presence or absence of lithium metal deposition at the negative electrodes that constitute the electrode assembly was observed under an optical microscope. In the measurement, observed lithium metal deposition was evaluated as "x" and unobserved lithium metal deposition as "○". Moreover, an average thickness in the stacking direction was measured for each electrode assembly. Table 1 shows the evaluation result of lithium metal deposition in Evaluation Test 1 and the average thickness of the electrode assembly for each battery.

[Evaluation Test 2]

An evaluation test was performed for each battery according to the method of Evaluation Test 1 except for performing high-rate charge/discharge cycles at 2 C for charge and 0.3 C for discharge. Table 1 also shows the evaluation result of lithium metal deposition in Evaluation Test 2 and the average thickness of the electrode assembly for each battery.

TABLE 1

| | Evaluation test 1 (at 1 C) | | Evaluation test 2 (at 2 C) | |
| --- | --- | --- | --- | --- |
| | Li deposition evaluation | Thickness of electrode assembly (mm) | Li deposition evaluation | Thickness of electrode assembly (mm) |
| Before test | — | 23.6 | — | 23.6 |
| Example 1 | ○ | 23.6 | ○ | 23.6 |
| Example 2 | ○ | 23.8 | x | 24.3 |
| Comparative Example 1 | x | 24.2 | x | 24.4 |

As is clear from the comparison among Examples 1 and 2 and Comparative Example 1, when the charge/discharge cycle test was performed at 1 C, lithium metal deposition was observed at the negative electrode after the charge/discharge cycle test in the battery A3 of Comparative Example 1 whereas lithium metal deposition was not observed in the batteries A1 and A2 of the Examples. This is presumably because by providing the notches 26, the occurrence of bending and creases of the positive tab section is suppressed even after repeated charge/discharge cycles to maintain a distance between a positive electrode and a negative electrode, thereby suppressing lithium metal deposition at the negative electrode during charging.

Further, when the further severe charge/discharge cycle test at 2 C was performed, lithium metal deposition was observed at the negative electrode in the battery A2 of Example 2 and the battery A3 of Comparative Example 1 whereas lithium metal deposition was not observed in the battery A1 of Example 1. These observations suggest that a lithium-ion battery further suitable to high-rate charge/discharge can be manufactured by disposing the terminal edges of the notches 26, which are provided at both ends of the boundary 28 between the positive tab section 24 and the positive electrode active material layer 22 on the positive y-axis direction side, at positions that do not overlap the negative electrode active material layer 32 when viewed from the stacking direction.

Further, compared with the battery A3 of Comparative Example 1, expansion of the electrode assembly 3 was suppressed even after repeated charge/discharge cycles in the batteries A1 and A2 of the Examples. Such suppressive effects on expansion were particularly remarkable in the battery A1 of Example 1. This is presumably because curving of the positive electrode due to the occurrence of bending or creases of the positive tab section is suppressed even after repeated charge/discharge cycles.

REFERENCE SIGNS LIST

1 Battery (lithium-ion battery)
3 Electrode assembly
4 Case
5 Sealing plate
5a Positive terminal mounting hole
5b Negative terminal mounting hole
6 Positive electrode current collector
7 Positive terminal
8 Negative electrode current collector
9 Negative terminal
10 to 13 Insulator
14 Gas release valve
15 Electrolyte solution feed port
16 Sealing plug
17 Insulating sheet
20 Positive electrode (first electrode)
22 Positive electrode active material layer (first active material layer)
24 Positive tab section (first tab section)
26 Notch
28 Boundary
30 Negative electrode (second electrode)
32 Negative electrode active material layer (second active material layer)
34 Negative tab section
40 Separator

The invention claimed is:

1. A lithium-ion battery comprising an electrode assembly including a first electrode and a second electrode, wherein:
the first electrode includes a substrate, a first active material layer formed on a surface of the substrate, and a first tab section having a substrate-exposed portion in which the first active material layer is not formed on the surface;
the first active material layer has one or more notches in an end of the first active material layer; and
an outer edge of the notches encloses an end of a boundary where the first tab section and the first active material layer come into contact, wherein
 in the electrode assembly, a terminal edge of the notches on a side of the first tab section is placed at a position that does not overlap a second active material layer of the second electrode when viewed from a stacking direction of the first electrode and the second electrode.

2. The lithium-ion battery according to claim 1, wherein the notches are in an end of the first tab section.

3. The lithium-ion battery according to claim 1, wherein a contact portion of the outer edge of the notches with the first active material layer has a circular arc or an elliptical arc when viewed from the stacking direction of the first electrode and the second electrode.

4. The lithium-ion battery according to claim 1, wherein the substrate is an aluminum foil or an aluminum alloy foil.

5. The lithium-ion battery according to claim 1, wherein the notches are at both ends of the boundary.

6. The lithium-ion battery according to claim 1, wherein:
 the first electrode is a positive electrode and the second electrode is a negative electrode; and
 the first active material layer has a filling density of an active material of 3.5 g/cm$^3$ or more.

\* \* \* \* \*